June 28, 1966 A. SCHUSTER 3,258,277
CHECK BOOK-PERSONALIZED CHECK IDENTIFICATION BY
MEANS OF PHOTOGRAPH
Filed Dec. 7, 1964 2 Sheets-Sheet 1
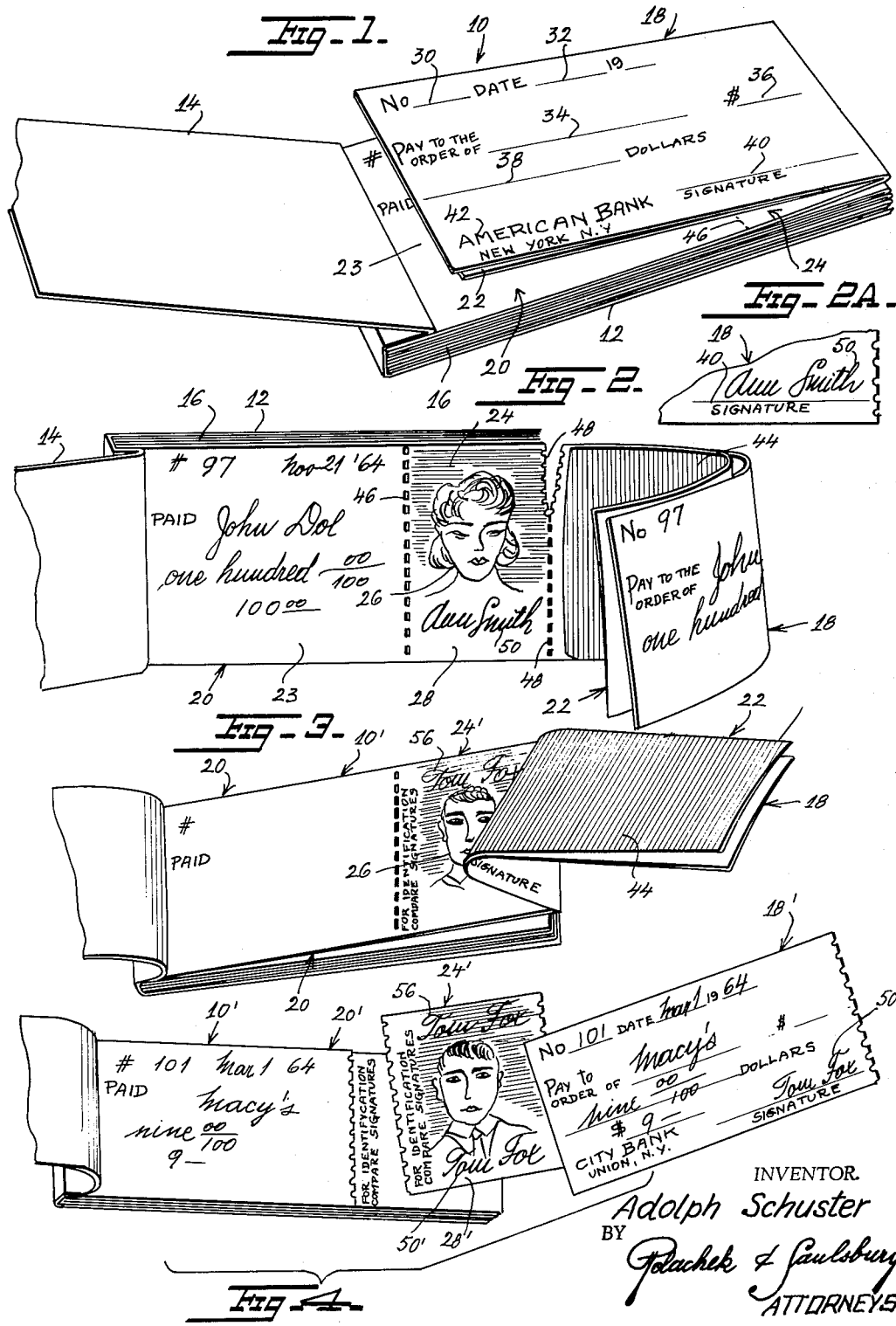
INVENTOR.
Adolph Schuster
BY Polachek & Saulsbury
ATTORNEYS.

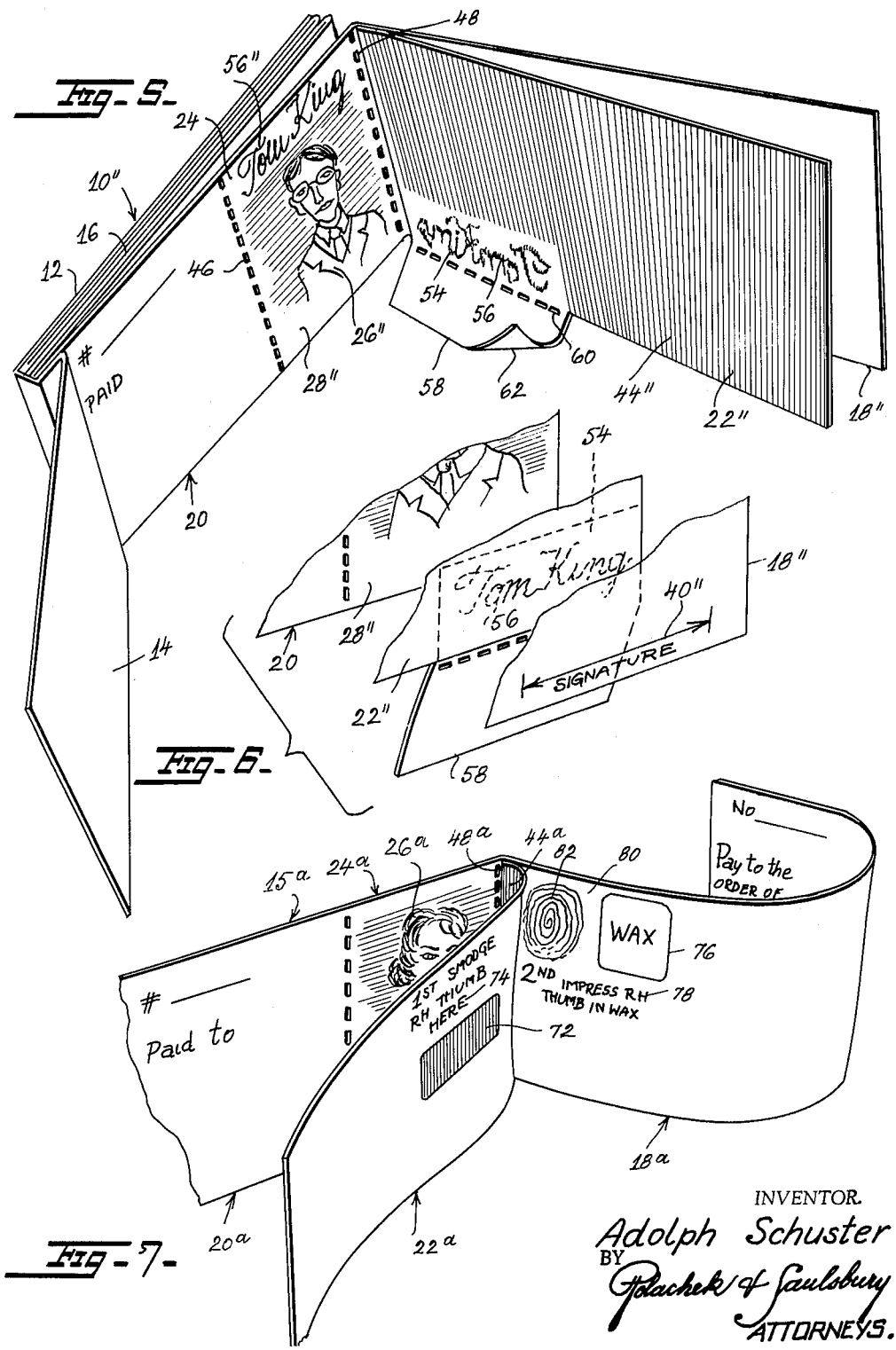

United States Patent Office 3,258,277
Patented June 28, 1966

3,258,277
CHECK BOOK-PERSONALIZED CHECK IDENTIFICATION BY MEANS OF PHOTOGRAPH
Adolph Schuster, 200 E. 110th St., New York 29, N.Y.
Filed Dec. 7, 1964, Ser. No. 416,242
6 Claims. (Cl. 282—22)

This invention relates to checkbooks and more particularly to a new and useful improvement in a check blank and stub whereby entry is required to be made of such information as the date, payee and amount of the check as an incidence to the writing out of the check and which embodies safeguards to prevent inadvertent or unauthorized use of the stub as a check and which provides for imprint of the check in a manner to prevent alteration thereof.

One of the problems sought to be overcome by the concepts of this invention, resides in the tendency for many to write out checks without corresponding entry on record-keeping material, such that the payer often loses track of the check to the end that subsequent accounting becomes confused and inaccurate. Various schemes and techniques have been devised for the entry of the essential elements of the check upon a retained check stub, but these have proven unsatisfactory.

Aside from the foregoing, the financial services are continuously in search of a foolproof means for the preparation of checks to prevent the unscrupulous from tampering with the amount for which the check has been written or other elements of the check.

It is an object of this invention to produce a checkbook which embodies all of the desirable features heretofore described.

An important object of the present invention is to produce a checkbook assembly which requires entries to be made upon a stub sheet concurrently with the entry of the particular information by the payer, so that there will always be an exact record of the essential information of the check on the stub sheet that is permanently retained.

Another object of the invention is to produce a checkbook of the type described in which the elements inscribed on the check are incapable of alteration without detection, thereby to safeguard against the handling of an issued check in a manner not authorized by the payer.

Still another object of the invention is to provide a safety checkbook which will familiarize creditors with the appearance of the writers of such checks, and which will otherwise publicize the identity of the owner of such bank account.

A specific object of the invention is to provide a check assembly wherein the picture of the payer is built into the stub sheet of the check assembly.

For further comprehension of the invention and of the objects and advantages thereof, reference will be had to the following description and accompanying drawings and to the appending claims in which the various novel features of the invention are more particularly set forth.

In the accompanying drawings forming a material part of this disclosure:

FIGURE 1 is a top perspective view of a checkbook embodying one form of the invention, the book being shown open and a check assembly in partly open condition.

FIG. 2 is a top plan view thereof with a check assembly in partly opened and severed condition, parts being shown broken away.

FIG. 2a is a fragment of the check shown in FIG. 2 with the sign of the payer shown thereon.

FIG. 3 is a view similar to FIG. 2 of a checkbook embodying a modified form of the invention.

FIG. 4 is a similar view showing the check and identification stub torn off of the checkbook and the check and stub filled out.

FIG. 5 is a front perspective view of a checkbook embodying another modified form of the invention, in partly open condition.

FIG. 6 is a fragmentary perspective view showing the signature space on the check, the genuine signature of the payor and the identification stub of the check assembly in spaced operative positions.

FIG. 7 is a front perspective view of a check book embodying yet another modified form of the invention, parts being shown broken away.

Referring now in detail to the various views of the drawings, in FIGURE 1 a check book embodying one form of the invention is illustrated and designated generally at 10. An elongated strip of cardboard is folded midway its ends and forms a bottom cover 12 and a top cover 14 for the book. A plurality of check assemblies 16 are bound together and clamped between the folded ends of the covers 12 and 14.

Each check assembly 16 consists of a check proper 18, a permanent stub backing sheet 20 and a sheet of carbon 22 interposed between the check proper and stub backing sheet. The check proper, stub backing sheet and carbon sheet are of the same dimensions and are in superimposed relation between the cover of the check book.

The stub backing sheet 20 includes a main section 23 for indicating the number of the check, the date of the check, the name of the payee and the amount paid. The stub backing sheet also includes an auxiliary section 24 on which is imprinted a photograph or image 26 of the payor and a blank space 28 therebelow for receiving a carbon copy of the payor's signature as it appears in the bottom of the check proper 18.

The check proper 18 on its face has the usual line 30 for the number of the check, a line 32 for the date, a line 34 for the name of the payee, a line 36 for the numerical amount, a line 38 for the written amount, and a line 40 for the signature of the payor. The name of the bank 42 appears printed on the bottom left of the check proper.

The carbon sheet 22 is of ordinary construction with carbon substance 44 on one surface thereof facing the stub backing sheet 20.

The check proper 18 together with the auxiliary section 24 of the stub backing sheet are detachable from the main section 23 of the stub backing sheet along a first line of perforations 46 and such auxiliary section is adapted to be subsequently detached from the check proper 18 along a second line of perforations 48.

In the check assemblies 16 in the book, the space 40 on the face of the check proper 18 is positioned above the space 28 below the photograph 26 of the payor, and the spaces 30, 32, 34, 38 are positioned over the main section 23 of the stub backing sheet 20. Accordingly, while the blanks or spaces on the face of the check proper 18 are being filled in, such data is being duplicated on the main section 23 of the stub backing sheet 20 by means of the carbon sheet 22, and when the signature is being affixed to the face of the check proper 18 in space 40, as indicated at 50 in FIG. 2a, such signature is being impressed and duplicated in the space 28 below the photograph 26 of the payor as indicated at 50 by means of the carbon sheet 22. This signature 50 appearing in space 28 may be compared with the genuine signature of the payor to check its authenticity.

In actual use, the writer of the check, when giving the check to a stranger or to anyone who might be interested in having the writer's photograph, removes the identification section 24 together with the check proper 18 at the row of perforations 46. At any time subsequent thereto, the identification section 24 may be conveniently removed along the other row of perforations 48. In the meantime, the person accepting the check has the opportunity to check the identity of the writer of the check and to keep a permanent record of such person writing the check in the event that such check is not honored at the bank, or in the event that it is found necessary to locate the writer of the check for any other reason.

In FIGS. 3 and 4, a check book 10' made in accordance with a slightly modified form of the invention is shown. Check book 10' differs from check book 10 merely in that the auxiliary section 24' of the stub backing sheet 20' is provided with the printed duplicate of the genuine signature 56 above the photograph 26' of the payor. Accordingly, the signed signature 50' of the writer of the check proper 18' that appears in duplicate in section 28' of auxiliary section 24' below the photograph may be readily compared with the genuine signature 56 above the photograph.

A check book 10" with another modified form of the invention is illustrated in FIGS. 5 and 6. Book 10" differs from check book 10' in that the carbon sheet 22" is provided with a clear portion 54 at the lower right hand corner thereof of the surface covered with carbon substance 44", opposite the signature space 40" on the check proper 18". In this clear portion 54 there is imprinted the genuine signature 56 in reverse, in carbon substance, of the payor. This clear portion 54 is adapted to be covered by a flexible sheet 58 of the same dimensions as the portion 54 and adapted to be separated from the carbon sheet 22" by a line of perforations 60. The cover sheet 58 is clear of carbon substance on its inner surface but is covered with carbon substance 62 on its outer surface as viewed in FIG. 5.

In use, the cover sheet 58 is normally in closed position so that the signature of the writer of the check proper 18" will be duplicated in the space 28" below the photograph 26". The duplicate of the writer's signature appearing in space 28" may then be compared with the genuine signature 56" of the payor appearing above the photograph.

Another check of the duplicate signature of the writer of the check appearing in space 28" may also be made by removing the cover sheet 58 and impressing or imprinting the genuine signature 56 appearing in clear space 54 of the carbon sheet 22" in superimposed relation thereover, whereby any difference between the signature 56 and the duplicate signature in space 24' will be readily obvious.

In all other respects, the checkbook 10" is similar to the checkbook 10 and similar reference numerals are used to indicate similar parts.

In FIG. 7, a modified form of check assembly 16a is shown. A plurality of such assemblies 16a may be readily clamped between covers such as the covers 12 and 14 of checkbook 10. The check assembly 16a consists of a check proper 18a, a permanent stub backing sheet 20a and a sheet of carbon 22a interposed between the check proper and stub backing sheet. The check proper, stub backing sheet and carbon sheet are of substantially the same dimensions and are in superimposed relation between the covers of the check book.

The stub backing sheet 20a comprises a main section 23a and auxiliary section 24a separated by a line of perforations.

The face of check proper 18a is similar to face of check proper 18 but on the rear face of the check proper spaced from the right hand corner thereof there is a wax impression 70 square in shape. The check proper is separated from the auxiliary section 24a by a second line of perforations 48a.

The carbon sheet 22a is provided with carbon substance 44a on its surface facing the stub backing sheet 20a, and on its opposite surface facing the check proper 18a, there is a rectangular space with carbon substance thereon as indicated at 72. Above the rectangular space 72 there is indicia 74 reading, "1st Smudge R. H. Thumb Here."

The face of the check proper 18a is similar to the face of check proper 18 but on the rear face thereof spaced from the right hand corner thereof there is a wax impression 76, square in shape. Below the wax impression there is indicia 78 reading "and Impress R. H. Thumb in Wax." Above the indicia and to the left of the wax impression 76 as viewed in FIG. 7, there is a clear space 80 in which is imprinted a reproduction of the thumb print 82 of the payor.

In using the assembly 16a, when the writer of the check proper 18a signs his name to the front face of the check proper at the bottom right hand corner thereof, such signature will be duplicated on the auxiliary section 24a of the stub backing sheet 20a, below the picture 26a, and the payee can use the picture and the duplicate signature to check the authenticity of the check.

The strip 72 of carbon substance and the wax impression 16 serve as additional safeguards for protecting the payee, as the payor at the time of signing the check proper 18a will turn the check proper over, separate the check proper from the carbon sheet 22a and imprint his right hand thumb in the space 80 on the rear face of the check proper by smudging his right hand thumb on the carbon substance 72, then impressing the smudged surface of the thumb onto the wax impression 76 where it can be compared with the genuine thumb print 82 in space 80 on the rear of the check proper.

While I have illustrated and described the preferred embodiments of my invention, it is to be understood that I do not limit myself to the precise constructions herein disclosed and that various changes and modifications may be made within the scope of the invention as defined in the appended claims.

Having thus described the invention, what I claim as new, and desire to secure by United States Letters Patent is:

1. A safety check book comprising, in combination, a plurality of folded check assemblies, each including a check proper having a signature space, a stub backing sheet and a carbon sheet between the check proper and backing sheet, said stub backing sheet including a main section and an identification section detachable from the main section and from the check proper, said main section having a surface with a printed portion and a clear portion, the clear portion adapted to receive by means of said carbon sheet data being written on the face of the check proper, said identification section having imprinted thereon a picture of the proposed signer of the check proper, on the same side as the printing on the main section, and having a clear portion adapted to receive by means of the carbon sheet a duplicate of the signature being signed on the signature space of the check proper, said check proper, stub backing sheet and carbon sheet being of substantially the same dimensions, with the printed matter and signature space on the check proper being printed on the side opposite to the side bearing the imprinted picture on the identification section, said signature on the check proper registering with the clear space under the picture on the identification section.

2. A safety check book comprising, in combination, a plurality of folded check assemblies, each including a check proper having a signature space, a stub backing sheet and a carbon sheet between the check proper and the backing sheet, said stub backing sheet including a main section and an identification section detachable from the main section and from the check proper, said identification section having imprinted thereon a picture of the proposed signer of the check proper, on the same side as the printing on the main section, and having a clear portion adapted to receive by means of the carbon sheet a duplicate of the signature being signed to the check proper, said check proper, stub backing sheet and carbon sheet being of substantially the same dimensions, with the signature space on the check proper registering with the clear space under the picture on the identification section, said identification section having a duplicate of the genuine signature of the proposed signer of the check proper, above the picture imprinted thereon, for comparison with the duplicate of the signature being signed to the check proper and appearing below the picture.

3. A safety check book comprising, in combination, a plurality of folded check assemblies, each including a check proper having a signature space, a stub backing sheet and a carbon sheet between the check proper and backing sheet, said stub backing sheet including a main section and an identification section detachable from the main section and from the check proper, said main section having a clear surface adapted to receive by means of said carbon sheet data being written on the face of the check proper, said identification section having imprinted thereon a picture of the proposed signer of the check proper, on the same side as the printing on the main section, and having a clear portion adapted to receive by means of the carbon sheet a duplicate of the signature being signed to the check proper, said check proper, stub backing sheet and carbon sheet being of substantially the same dimensions, with the signature space on the check proper registering with the clear space under the picture on the identification section, said identification section having a duplicate of the genuine signature of the proposed signer of the check proper, above the picture imprinted thereon, for comparison with the duplicate of the signature being signed to the check proper and appearing below the picture.

4. A safety check book comprising, in combination, a plurality of folded check assemblies, each including a check proper, a stub backing sheet and a carbon sheet between the check proper and the backing sheet, said stub backing sheet including a main section and an identification section detachable from the main section and from the check proper, said identification section having imprinted thereon a picture of the proposed signer of the check proper, and having a clear portion adapted to receive by means of the carbon sheet a duplicate of the signature being signed to the check proper, said check proper, stub backing sheet and carbon sheet being of substantially the same dimensions, with the signature space on the check proper registering with the clear space under the picture on the identification section, said identification section having a duplicate of the genuine signature of the proposed signer of the check proper, above the picture imprinted thereon, for comparison with the duplicate of the signature being signed to the check proper and appearing below the picture, said carbon sheet having a clear portion on its carbon surface opposite the space on the check proper for the signature, a reproduction of the genuine signature of the proposed signer of the check proper imprinted on said clear portion, in inverse manner, a hinged sheet covering said space, the outer surface of said hinged sheet being surfaced with carbon substance for duplicating the signature being signed to the check proper onto the identification section in the space below the picture, said inverse imprint of the genuine signature adapted to be impressed on the duplicate of the signature below the picture upon removal of the hinged cover sheet.

5. A safety check book comprising, in combination, a plurality of folded check assemblies, each including a check proper, a stub backing sheet and a carbon sheet between the check proper and backing sheet, said stub backing sheet including a main section and an identification section detachable from the main section and from the check proper, said main section having a clear surface adapted to receive by means of said carbon sheet data being written on the face of the check proper, said identification section having imprinted thereon a picture of the proposed signer of the check proper, and having a clear portion adapted to receive by means of the carbon sheet a duplicate of the signature being signed to the check proper, said check proper, stub backing sheet and carbon sheet being of substantially the same dimensions, with the signature space on the check proper registering with the clear space under the picture on the identification section, said identification section having a duplicate of the genuine signature of the proposed signer of the check proper, above the picture imprinted thereon, for comparison with the duplicate of the signature being signed to the check proper and appearing below the picture, said carbon sheet having a clear portion on its carbon surface opposite the space on the check proper for the signature, a reproduction of the genuine signature of the proposed signer of the check proper imprinted on said clear portion in inverse manner, a hinged sheet covering said space, the outer surface of said hinged sheet being surfaced with carbon substance for duplicating the signature being signed to the check proper onto the identification section in the space below the picture, said inverse imprint of the genuine signature adapted to be impressed on the duplicate of the signature below the picture upon removal of the hinged cover sheet.

6. A safety check book comprising, in combination, a plurality of folded check assemblies, each including a check proper, a stub backing sheet and a carbon sheet between the check proper and backing sheet, said stub backing sheet including a main section and an identification section detachable from the main section and from the check proper, said main section having a clear surface adapted to receive by means of said carbon sheet data being written on the face of the check proper, said identification section having imprinted thereon a picture of the proposed signer of the check proper, and having a clear portion adapted to receive by means of the carbon sheet a duplicate of the signature being signed to the check proper, said carbon sheet having a clear surface on one side thereof, a strip of carbon substance on said clear surface adjacent the upper right hand corner thereof, indicia giving directions for use above said carbon strip on said clear surface, a wax impression on the rear face of the check proper adjacent the upper right hand corner thereof, indicia giving direction for use below said wax impression, and a reproduction of the thumb print of the proposed signer of the check proper on the rear face of the check proper between said wax impression and the adjacent end of the check proper, said strip of carbon substance adapted to provide a smudge on the thumb of the signer of the check, said wax impression adapted to receive the smudged thumb for imprinting the print of the thumb on said wax impression and adapted to be compared with the genuine thumb print on the rear of the check proper.

References Cited by the Examiner

UNITED STATES PATENTS

| | | | |
|---|---|---|---|
| 493,223 | 3/1893 | Schafer | 283—7 |
| 604,926 | 5/1898 | Beers | 283—7 |
| 656,325 | 8/1900 | McCulloch | 283—58 |
| 2,198,802 | 4/1940 | Brady | 283—7 |
| 2,310,332 | 2/1943 | Wilbanks | 282—22 |
| 3,147,028 | 9/1964 | Scully | 282—23 |

LAWRENCE CHARLES, *Primary Examiner.*